(12) United States Patent
Sato

(10) Patent No.: US 10,718,482 B2
(45) Date of Patent: Jul. 21, 2020

(54) VEHICLE LAMP WITH PLATE LIKE LENS HAVING FRONT AND REAR LENS CUTS

(71) Applicant: STANLEY ELECTRIC CO., LTD., Tokyo (JP)

(72) Inventor: Koji Sato, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/423,248

(22) Filed: May 28, 2019

(65) Prior Publication Data

US 2019/0360656 A1 Nov. 28, 2019

(30) Foreign Application Priority Data

May 25, 2018 (JP) ................... 2018-100267

(51) Int. Cl.
*F21S 41/25* (2018.01)
*G02B 5/02* (2006.01)
*G02B 27/09* (2006.01)

(52) U.S. Cl.
CPC ............ *F21S 41/25* (2018.01); *G02B 5/0205* (2013.01); *G02B 27/0955* (2013.01)

(58) Field of Classification Search
CPC .............. G02B 27/095; G02B 27/0955; G02B 27/0961; F21V 5/00; F21S 41/275; F21S 41/25
See application file for complete search history.

(56) References Cited

U.S. PATENT DOCUMENTS

| 1,478,680 | A | * | 12/1923 | Soderberg | ................. F21V 5/00 362/333 |
| 1,486,720 | A | * | 3/1924 | Bausch | ..................... F21V 5/00 362/333 |
| 2007/0030688 | A1 | | 2/2007 | Amano et al. | |
| 2013/0322075 | A1 | | 12/2013 | Hadrath | |
| 2016/0265740 | A1 | | 9/2016 | Booij et al. | |
| 2018/0024371 | A1 | | 1/2018 | Schwaiger et al. | |

FOREIGN PATENT DOCUMENTS

JP 6-56903 U 8/1994

OTHER PUBLICATIONS

Extended Search Report issued in European Application 19176529. 6-1020 dated Oct. 25, 2019.

* cited by examiner

*Primary Examiner* — Robert J May
(74) *Attorney, Agent, or Firm* — Xsensus LLP

(57) ABSTRACT

A vehicular lamp includes: a plate-like lens body including a front surface and a rear surface; and a light source provided at the rear of the lens body and emitting light rays of uniform luminance which are irradiated forward through the lens body to form a predetermined light distribution pattern. The front surface includes front lens cuts; the rear surface includes rear lens cuts facing the front lens cuts, respectively; the rear lens cuts are provided in respective inclined postures so that the output directions of light rays having entered the lens body while being refracted by the respective rear lens cuts and having been outputted through the respective front lens cuts are the same as one another; and distances between the rear lens cuts and the front lens cuts are adjusted so that the luminances of light rays outputted through the respective front lens cuts are made uniform.

20 Claims, 5 Drawing Sheets

VEHICLE LAMP WITH PLATE LIKE LENS HAVING FRONT AND REAR LENS CUTS

This application claims the priority benefit under 35 U.S.C. § 119 of Japanese Patent Application No. 2018-100267 filed on May 25, 2018, which is hereby incorporated in its entirety by reference.

TECHNICAL FIELD

The present invention relates to a vehicular lamp, and more particularly, to a vehicular lamp in which a lens body, for example, an inner lens, outputs light uniformly without luminance unevenness.

BACKGROUND ART

Conventionally, there has been known a vehicular lamp provided with an inner lens, and a light source (light bulb) provided behind the inner lens, which emits light that passes through the inner lens and is irradiated forward to form a predetermined light distribution pattern (for example, see Japanese Utility Model Application Laid-Open No. Hei. 6-056903).

In the vehicular lamp disclosed in Japanese Utility Model Application Laid-Open No. Hei. 6-056903, light from the light source enters the inner lens while being refracted by a Fresnel lens step that is formed in the rear surface (back surface) of the inner lens, and exits as light condensed by a fisheye lens step formed in the front surface of the inner lens.

However, in the vehicular lamp disclosed in the aforementioned publication, the luminous intensity of the light outputted through the fisheye lens step provided at a distance from the optical axis is lower than the luminous intensity of the light outputted through the fisheye lens step provided at a distance nearer the optical axis, and thus the portion of the inner lens at a distance from the optical axis emits light darker than the portion at a distance nearer the optical axis. As a result, there is a problem that luminance unevenness occurs and the inner lens (front surface) does not output light uniformly.

SUMMARY

The present invention has been made in view of the aforementioned circumstances, and an object thereof is to provide a vehicular lamp having a lens body, for example, an inner lens, capable of outputting light uniformly without luminance unevenness.

According to an aspect of the present invention, there is provided a vehicular lamp comprising: a plate-like lens body including a front surface and a rear surface on the opposite side thereof; and a light source provided at the rear of the lens body and emitting light rays of uniform luminance which are irradiated forward through the lens body to form a predetermined light distribution pattern. Herein, the front surface includes a plurality of front lens cuts; the rear surface includes a plurality of rear lens cuts facing the plurality of front lens cuts, respectively; the plurality of rear lens cuts are provided in respective inclined postures so that the output directions of the light rays which have entered the lens body while being refracted by the respective rear lens cuts and have been outputted through the respective front lens cuts are the same as one another; and distances between the plurality of rear lens cuts and the plurality of front lens cuts are adjusted so that the luminances of light rays which have been emitted from the light source and outputted through the respective front lens cuts are made uniform.

According to this aspect, it is possible to provide a vehicular lamp in which the lens body, for example, the inner lens, outputs light uniformly without luminance unevenness.

This is because, firstly, the adopted light source can emit light rays of uniform luminance, and secondly, the distances between the plurality of rear lens cuts and the plurality of front lens cuts are respectively adjusted so that the luminances of the light rays from the light source which are outputted through of the plurality of respective front lens cuts become uniform.

Further, in the aforementioned present invention, a preferable aspect is configured such that the distances between the plurality of rear lens cuts and the plurality of front lens cuts are adjusted so that optical path lengths, which are each a distance at which the light rays from the light source that have entered the lens body while being refracted by the respective rear lens cuts and have been outputted through the respective front lens cuts pass through the lens body, are the same as one another.

In the aforementioned present invention, a preferable aspect is configured such that the lens body is curved in at least one of the vertical direction and the horizontal direction.

In the above invention, a preferable aspect is configured such that the lens body is disposed in a posture inclined at a predetermined backward angle with respect to at least one of a reference axis extending in the vehicle width direction and a reference axis extending in the vertical direction.

Further, in the aforementioned present invention, a preferable aspect is configured such that the plurality of front lens cuts are formed in the same shape and oriented in the same direction.

In the aforementioned present invention, a preferable aspect is configured such that each of the plurality of front lens cuts is a diffusion surface configured to diffuse the light rays from the light source, which are to be outputted through the front lens cuts, in up, down, left, and right directions.

In the aforementioned present invention, a preferable aspect is configured such that each of the plurality of front lens cuts is a convex lens surface convex to the side opposite to the light source.

Further, In the aforementioned present invention, a preferable aspect is configured such that the front surface includes a projecting portion configured to project from the front surface in the light output direction and be provided with the front lens cut at its tip.

In the aforementioned present invention, a preferable aspect is configured such that each of the plurality of front lens cuts has an outer shape of a hexagon.

BRIEF DESCRIPTION OF DRAWINGS

These and other characteristics, features, and advantages of the present invention will become clear from the following description with reference to the accompanying drawings, wherein.

DESCRIPTION OF EXEMPLARY EMBODIMENTS

Figure 1A:
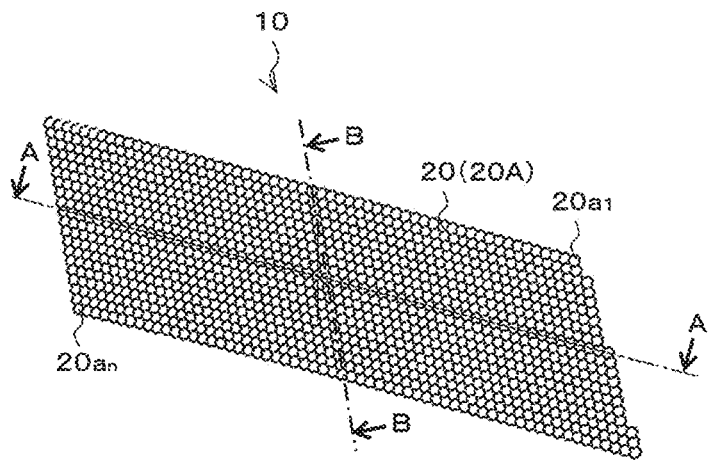
FIGS. 1A, 1B, and 1C are a front view, a top view, and a side view of a vehicular lamp made in accordance with principles of the present invention, respectively.

A description will now be made below to a vehicular lamp of the present invention with reference to the accompanying drawings in accordance with exemplary embodiments. Components corresponding to each other in the drawings are denoted by the same reference numerals, and a repetitive description thereof is omitted.

Figure 1B:
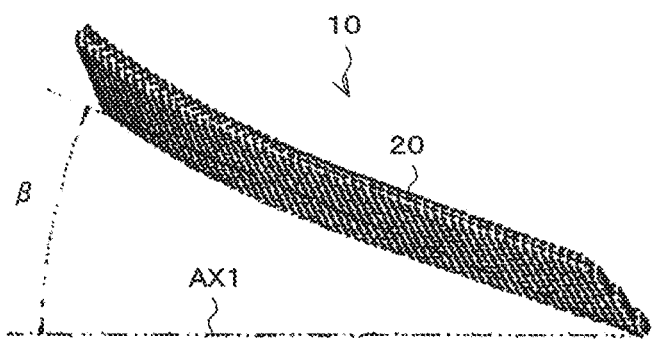
Figure 1C:
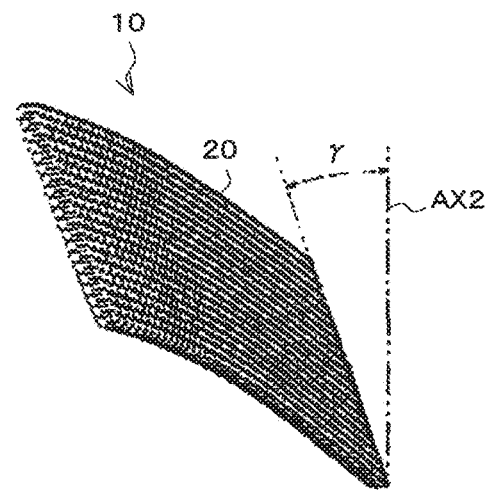

FIGS. 1A, 1B, and 1C are a front view, a top view, and a side view of a vehicular lamp 10 made in accordance with the principles of the present invention, respectively.

The vehicular lamp 10 shown in FIG. 1 is a sign lamp (or signal lamp) that functions as a stop lamp, for example, and is mounted on both left and right sides of a rear end portion of a vehicle such as an automobile. Since the vehicular lamp 10 mounted on both the left and right sides has a symmetrical configuration, the vehicular lamp 10 mounted on the right side of the rear end of the vehicle, i.e., the right side toward the rear of the vehicle, will be described below as a representative.

Figure 2:
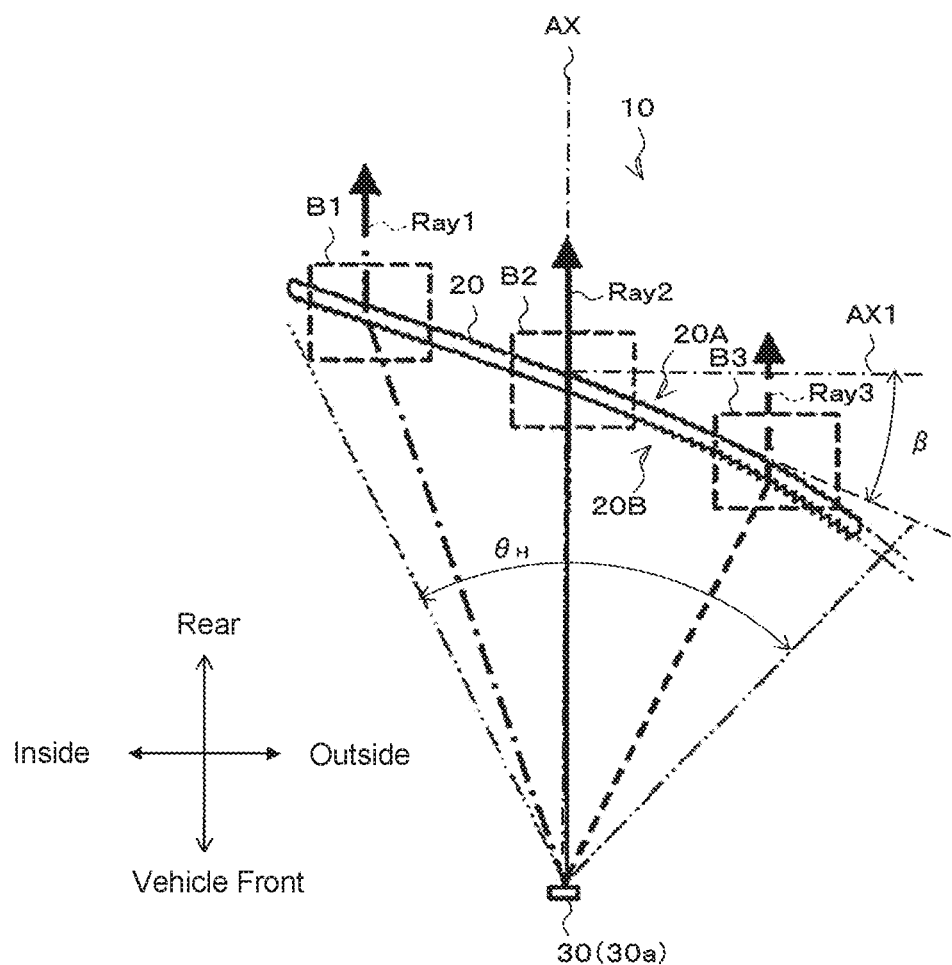
FIG. 2 is a cross-sectional view of the vehicular lamp 10 shown in FIG. 1A taken along line A-A.
Figure 3:
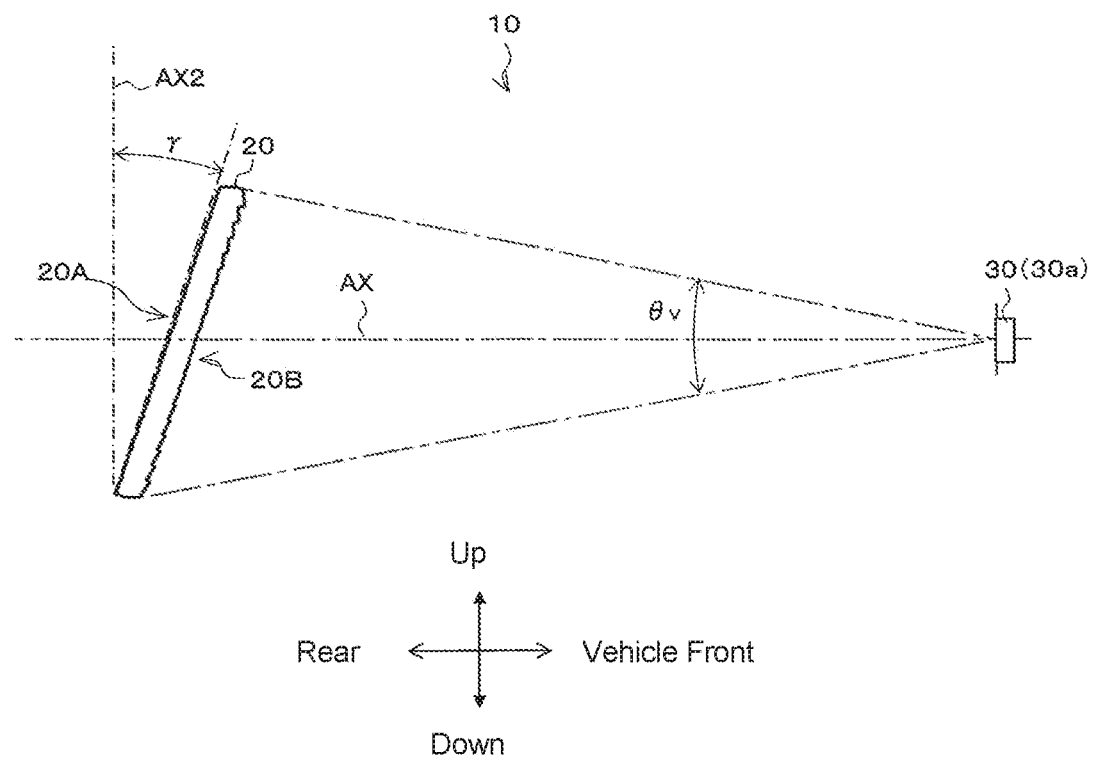
FIG. 3 is a cross-sectional view of the vehicular lamp 10 shown in FIG. 1A taken along line B-B.

FIG. 2 is a cross-sectional view of the vehicular lamp 10 shown in FIG. 1A taken along line A-A, and FIG. 3 is a cross-sectional view of the vehicular lamp 10 shown in FIG. 1A taken along line B-B.

As shown in FIGS. 2 and 3, the vehicular lamp 10 of the present exemplary embodiment includes a lens body 20, and a light source 30 which is provided behind the lens body 20 and emits light rays of uniform luminance that pass through the lens body 20 and are irradiated forward to form a stop lamp light distribution pattern. Although not shown, the vehicular lamp 10 is disposed in a lamp chamber formed by an outer lens and a housing, and is attached to the housing or the like.

The light source 30 is a light source that emits light rays of uniform luminance that irradiates a rear surface 20B of the lens body 20 with the light rays. The light source may emit red light when the vehicular lamp 10 is used as a stop lamp.

The light source 30 radially emits light rays of uniform luminance at least in a range of an angle $\theta_H$ shown in FIG. 2 in the A-A cross section and in a range of an angle $\theta v$ shown in FIG. 3 in the B-B cross section, to irradiates the rear surface 20B of the lens body 20 therewith. The angles $\theta_H$ and $\theta_V$ may be set to any angles within 20 to 70 degrees, for example, in accordance with the intended purpose, regulations, law, etc.

Examples of the light source 30 adopted may include light sources described, for example, in Japanese Patent Application Laid-Open No. 2016-085827. An exemplary light source 30 is constituted by a semiconductor light-emitting element 30a such as an LED, and a lens unit (not shown) provided in front of the semiconductor light emitting element 30a. Such a semiconductor light-emitting element 30a is configured to emit light rays having the strongest luminous intensity along the optical axis and light rays decreasing in luminous intensity as the angle with respect to the optical axis increases. As described above, the semiconductor light-emitting element 30a can emit red light when the vehicular lamp 10 is used as a stop lamp. The lens unit is configured to convert light rays from the semiconductor light emitting element 30a into light rays of uniform luminance.

The lens body 20 is a plate-like lens body including a front surface 20A and the rear surface 20B on the opposite side to the front surface 20A, and is configured as, for example, an inner lens. The front surface 20A is configured, for example, on the basis of a reference plane RP1 indicated by a dashed-dotted line in FIG. 4, and the rear surface 20B is configured, for example, on the basis of a reference plane RP2 indicated by a dashed-two dotted line in FIG. 4.

The lens body 20 is formed of a transparent resin such as an acrylic resin or a polycarbonate resin, and is molded by injection molding. The basic thickness of the lens body 20 is, for example, 2 to 3 mm. As shown in FIGS. 1B and 1C, the lens body 20 is curved with a predetermined curvature in the vertical direction and the horizontal direction, respectively. It should be noted that the lens body 20 may be curved only in the vertical direction, may be curved only in the horizontal direction, or may not be curved in any direction.

The lens body 20 is disposed in a posture inclined by a predetermined backward angle β (see FIG. 1B, FIG. 2) with respect to a reference axis AX1 extending in a vehicle width direction and by a predetermined backward angle γ (see FIG. 1C, FIG. 3) with respect to a reference axis AX2 extending in the vertical direction. The angle β may be any angle within 0 to 45 degrees, for example, and the angle γ is any angle within 0 to 30 degrees, for example. It should be noted that the lens body 20 may be inclined only with respect to the reference axis AX1, may be inclined only with respect to the reference axis AX2, or may not be inclined with respect to any of the reference axes AX1 and AX2.

Figure 4A:
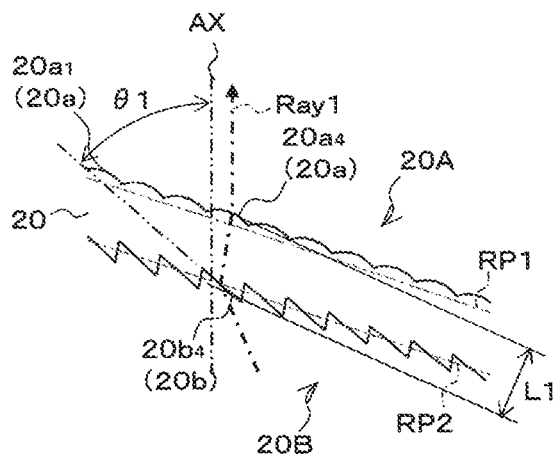
FIG. 4A is an enlarged view of a rectangle area B1 in FIG. 2.
Figure 4B:
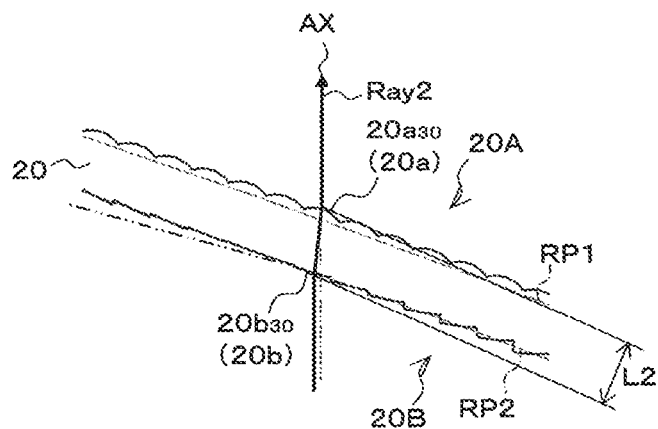
FIG. 4B is an enlarged view of a rectangle area B2 in FIG. 2.
Figure 4C:
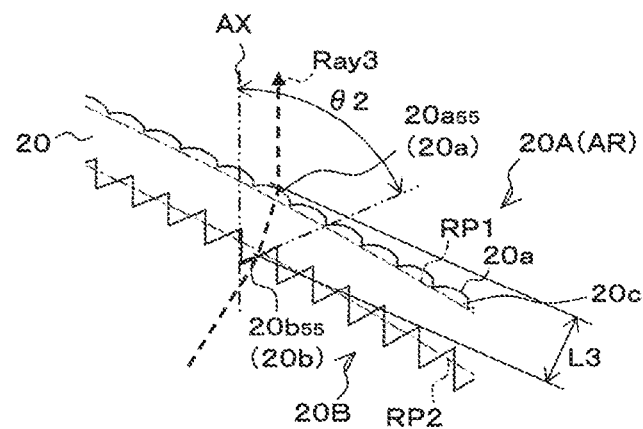
FIG. 4C is an enlarged view of a rectangle area B3 in FIG. 2.
Figure 5:
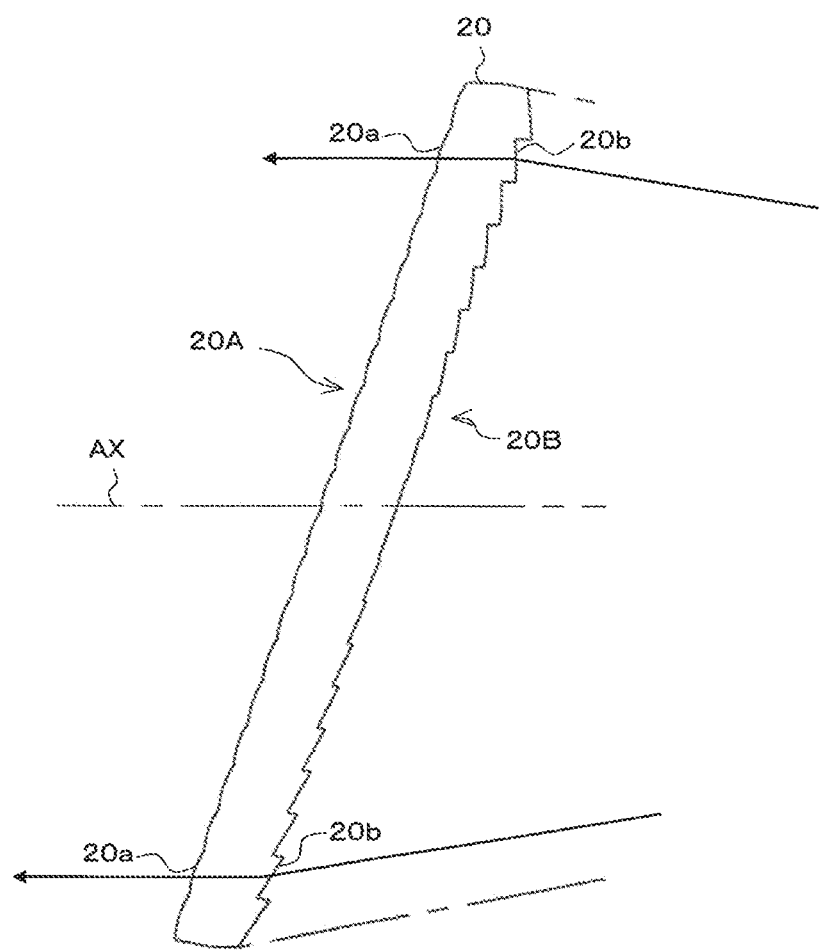
FIG. 5 is an enlarged view of a lens body 20 shown in FIG. 3.

FIG. 4A is an enlarged view of a rectangle area B1 in FIG. 2, FIG. 4B is an enlarged view of a rectangle area B2 in FIG. 2, and FIG. 4C is an enlarged view of a rectangle area B3 in FIG. 2; and FIG. 5 is an enlarged view of the lens body 20 shown in FIG. 3.

As shown in FIGS. 1A to 1C and 4A to 4C, the front surface 20A includes a plurality of front lens cuts $20a_1$ to $20a_n$. When the front lens cuts $20a_1$ to $20a_n$ are not specifically distinguished from one another, they are referred to simply as a front lens cut 20a herein.

The front lens cut 20a is a diffusion surface that diffuses the light rays from the light source 30 that are to be outputted through the front lens cut 20a upward, downward, leftward, and rightward, and is, for example, a convex lens surface (R surface) that is convex on the side opposite to the light source 30 (i.e., toward the light output direction). The surface shape (curvature or the like) of the convex lens surface is configured so that light rays from the light source 30 that are to be outputted through the convex lens surface are diffused upward, downward, leftward, and rightward to irradiate a region (standard range) in which a stop lamp light distribution pattern is formed on a virtual vertical screen facing the rear surface of the vehicle.

As shown in FIG. 1A, the front lens cuts 20a are densely disposed in a state of being adjacent to each other in the up, down, left, and right directions with almost no gap therebetween. In order to densely dispose the front lens cuts 20a in a state of being adjacent to each other in the up, down, left, and right directions with almost no gap therebetween, the front lens cuts 20a may have the outer shape of a regular hexagon.

The front lens cuts 20a are formed in the same shape and oriented in the same direction, see FIGS. 4A to 4C and FIG. 5. The front lens cut 20a may be disposed on the front surface 20A (see FIG. 4A and FIG. 4B), or may be disposed at the tip of a projecting portion 20c protruding from the front surface 20A (see FIG. 4C). The projecting portion 20c is, for example, a regular hexagonal prism projecting in the light output direction. The projecting portion 20c is provided, for example, in a region of the front surface 20A that is relatively largely curved as shown in FIG. 4C.

As shown in FIGS. 4A to 4C and 5, the rear surface 20B includes a plurality of rear lens cuts $20b_1$ to $20b_n$ to which the front lens cuts $20a_1$ to $20a_n$ face correspondingly. Hereinafter, when the rear lens cuts $20b_1$ to $20b_n$ are not specifically distinguished from one another, they are referred to simply as a rear lens cut 20b herein.

The rear lens cut 20b is a surface on which light rays from the light source 30 are incident while being refracted by the same to enter the lens body 20, and is, for example, a planar surface or a surface with a flat plane shape.

Although not clearly shown, the rear lens cuts 20b may be densely disposed in a state of being adjacent to each other in the up, down, left, and right directions with almost no gap therebetween and corresponding to the front lens cuts 20a.

Light rays from the light source 30 (see, for example, light rays Ray1 to Ray3 shown in FIGS. 4A to 4C) enter the lens body 20 while being refracted by the rear lens cuts 20b, pass through the lens body 20, and exits through the front lens cuts 20a opposite to the rear lens cuts 20b.

The rear lens cuts $20b_1$ to $20b_n$ are disposed in respective inclined postures so that the output directions of the light rays which have entered the lens body 20 while being refracted by the respective rear lens cuts $20b_1$ to $20b_n$ and have been outputted through the respective front lens cuts $20a_1$ to $20a_n$ are the same as one another, for example, like the light rays Ray1 to Ray3 illustrated in FIGS. 4A to 4C. In the present exemplary embodiment, "the same" is not limited to "the same" in a strict sense, and is used in a sense including substantially the same (almost the same).

For example, as shown in FIG. 4A, the rear lens cut $20b_4$ disposed on the left side with respect to the reference axis AX is provided in a posture inclined at an angle $\theta 1$ to the left side with respect to the reference axis AX such that the output direction of the light ray Ray1 from the light source 30 that has entered the lens body 20 while being refracted by the rear lens cut $20b_4$ and has been outputted through the front lens cut $20a_4$ facing to the rear lens cut $20b_4$ is parallel with the reference axis AX direction extending in the vehicle front-rear direction. The same applies to the other rear lens cuts 20b disposed on the left side with respect to the reference axis AX.

For example, as shown in FIG. 4B, the rear lens cut $20b_{30}$ disposed on the reference axis AX is provided in a posture substantially perpendicular to the reference axis AX such that the output direction of the light ray Ray2 from the light source 30 that has entered the lens body 20 while being refracted by the rear lens cut $20b_{30}$ and has been outputted through the front lens cut $20a_{30}$ facing to the rear lens cut $20b_{30}$ is parallel with the reference axis AX direction.

For example, as shown in FIG. 4C, the rear lens cut $20b_{55}$ disposed on the right side with respect to the reference axis AX is provided in a posture inclined at an angle $\theta 2$ to the right side with respect to the reference axis AX such that the output direction of the light ray Ray3 from the light source 30 that has entered the lens body 20 while being refracted by the rear lens cut $20b_{55}$ and has been outputted through the front lens cut $20a_{55}$ facing to the rear lens cut $20b_{55}$ is parallel with the reference axis AX direction. The same applies to the other rear lens cuts 20b disposed on the right side with respect to the reference axis AX.

Then, the distances (lens thickness; for example, see distances L1 to L3 shown in FIGS. 4A to 4C) between the rear lens cuts 20b and the front lens cuts 20a facing to the rear lens cuts 20b correspondingly are adjusted so that the luminances (or luminous intensities) of the light rays which have been emitted from the light source 30 (for example, see light rays Ray1 to Ray3 shown in FIGS. 4A to 4C) and outputted through the respective front lens cuts $20a_1$ to $20a_n$ are made uniform.

For example, the distances (for example, the distances L1 to L3 shown in FIGS. 4A to 4C) between the rear lens cuts 20b and the front lens cuts 20a facing to the rear lens cuts 20b are adjusted so that optical path lengths, which are each a distance at which the light rays from the light source 30 (for example, see the light rays Ray1 to Ray3 shown in FIGS. 4A to 4C) that have entered the lens body 20 while being refracted by the rear lens cuts $20b_1$ to $20b_n$ and have been outputted through the front lens cuts $20a_1$ to $20a_n$ pass through the lens body 20 becomes the same as one another.

As described above, the distances between the rear lens cuts 20b and the front lens cuts 20a are adjusted, and the distances (optical path lengths) that the light rays from the light source 30 that have entered the lens body while being refracted by the respective rear lens cuts $20b_1$ to $20b_n$ pass through the lens body 20 are made the same as one another. In this manner, the luminances of the light rays from the light source 30 which are outputted through the respective front lens cuts $20a_1$ to $20a_n$ become uniform.

As a result, the lens body 20 can output light uniformly without luminance unevenness. Note that the term "uniform" herein is not limited to uniform in a strict sense. That is, it is "uniform" as long as it can be evaluated that the light rays emitted are visually observed as being uniform.

In the vehicular lamp 10 having the above configuration, when the light source 30 is turned on, the light rays from the light source 30 are incident on and refracted by the respective rear lens cuts $20b_1$ to $20b_n$ to enter the lens body 20, pass through the lens body 20, and are outputted as light rays diffused upward, downward, leftward, and rightward from the respective front lens cuts $20a_1$ to $20a_n$.

At this time, since the outputting directions of the light rays outputted through the respective front lens cuts $20a_1$ to $20a_n$ are parallel with one another, the light rays outputted through the respective front lens cuts $20a_1$ to $20a_n$ are irradiated onto a certain same area on the virtual vertical screen. As a result, a stop lamp light distribution pattern (not shown) can be formed.

As described above, according to the present exemplary embodiment, it is possible to provide the vehicular lamp 10 in which the lens body 20 can output light rays uniformly without luminance unevenness.

This is because, firstly, the adopted light source 30 can emit light rays of uniform luminance, and secondly, the distances between the rear lens cuts $20b_1$ to $20b_n$ and the front lens cuts $20a_1$ to $20a_n$ are respectively adjusted so that the luminances of the light rays from the light source 30 that are outputted through the respective front lens cuts $20a_1$ to $20a_n$ become uniform (for example, the distances (optical path lengths) at which the light rays from the light source 30 that have entered the lens body 20 while being refracted by the rear lens cuts $20b_1$ to $20b_n$ pass through the lens body 20 are made the same).

In addition, according to the present exemplary embodiment, it is possible to provide the vehicular lamp 10 having high light utilization efficiency in which a predetermined light distribution pattern (standard range) such as a stop lamp light distribution pattern is irradiated with strong intensity of light rays (the vehicular lamp is caused to emit such light rays to that range) and other areas are not irradiated (the vehicular lamp is caused to emit no light thereto).

This is because the output directions (diffusion directions) of the light rays outputted through the front lens cuts $20a_1$ to $20a_n$ are the same, and are irradiated to a certain same area on the virtual vertical screen and not irradiated to any other areas.

Further, according to the present exemplary embodiment, the entire lens body 20 (e.g., the lens body 20 having an area of about 50 cm$^2$) can be caused to uniformly output light rays without uneven luminance with a single light source 30.

Further, according to the present exemplary embodiment, the vehicular lamp 10 can be provided in which the lens body 20 can be observed with favorable appearance both when the light source 30 is lit or not.

This is because the rear lens cuts 20b provided on the rear surface 20B of the lens body 20 are covered with the front lens cuts 20a provided on the front surface 20A of the lens body 20, which makes it difficult to visually recognize the rear lens cuts 20b.

Next, a modified example will be described.

In the above-described exemplary embodiment, an example in which the vehicular lamp of the present invention is applied to a stop lamp has been described, but the present invention is not limited thereto. For example, the vehicular lamp of the present invention may be applied to a vehicular lamp other than a stop lamp, for example, a headlamp, a rear combination lamp, a LID lamp, a DRL lamp, a turn signal lamp (for example, a turn signal lamp attached to a door mirror or the like), an indoor lamp, or other lighting devices for vehicle.

In the above-described exemplary embodiment, an example in which a convex lens surface convex toward the side opposite to the light source 30 is used as the front lens cuts 20a has been described, but the present invention is not limited thereto. For example, a concave surface concave toward the side opposite to the light source 30 may be used as the front lens cuts 20a, or a flat surface may be used.

In the above-described exemplary embodiment, an example in which the outer shape of the front lens cut 20a is a regular hexagon has been described, but the present invention is not limited thereto. For example, the outer shape of the front lens cut 20a may be a polygon other than a regular hexagon, a circle, an ellipse, or any other shape.

In the above-described exemplary embodiment, an example in which the front lens cuts 20a are formed in the same shape and oriented in the same direction has been described, but the present invention is not limited thereto. For example, some of the front lens cuts 20a may be configured in different shapes or oriented in different directions.

All of the numerical values shown in the above-described exemplary embodiments are exemplified, and it is needless to say that appropriate numerical values different from the shown ones can be used.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicular lamp comprising:
a plate-like lens body including a front surface and a rear surface on a side opposite thereto; and
a light source provided at a rear of the lens body and emitting light rays of uniform luminance which are irradiated forward through the lens body to form a predetermined light distribution pattern, wherein
the front surface includes a plurality of front lens cuts;
the rear surface includes a plurality of rear lens cuts facing the plurality of front lens cuts, respectively;
the plurality of rear lens cuts are provided in respective inclined postures so that output directions of the light rays which have entered the lens body while being refracted by the respective rear lens cuts and have been outputted through the respective front lens cuts are the same as one another;
distances between the plurality of rear lens cuts and the plurality of front lens cuts are adjusted so that luminances of light rays which have been emitted from the light source and outputted through the respective front lens cuts are made uniform;
the distances between the plurality of rear lens cuts and the plurality of front lens cuts are adjusted so that optical path lengths which are each a distance at which the light rays from the light source that have entered the lens body while being refracted by the respective rear lens cuts and have been outputted through the respective front lens cuts pass through the lens body, are the same as one another;
the lens body is curved in at least one of a vertical direction and a horizontal direction; and
the front lens cuts are formed in the same shape and densely disposed in a state of being adjacent to each other in vertical and horizontal directions and the rear lens cuts are formed in the same shape and densely disposed in a state of being adjacent to each other and corresponding to the respective front lens cuts.

2. The vehicular lamp according to claim 1, wherein the lens body is disposed in a posture inclined at a predetermined backward angle with respect to at least one of a reference axis extending in a vehicle width direction and a reference axis extending in a vertical direction.

3. The vehicular lamp according to claim 2, wherein each of the plurality of front lens cuts is a diffusion surface configured to diffuse the light rays from the light source, which are to be outputted through the front lens cuts, in up, down, left, and right directions.

4. The vehicular lamp according to claim 2, wherein when a longitudinal reference axis is defined to extend in a vehicle front-rear direction in the light output direction of the light rays, the inclined postures of the rear lens cuts are configured such that
the rear lens cut disposed on the longitudinal reference axis is provided in a posture perpendicular to the reference axis,
the rear lens cut disposed on a left side with respect to the longitudinal reference axis is provided in a posture inclined to the left side with respect to the longitudinal reference axis, and
the lens cut disposed on a right side with respect to the longitudinal reference axis is provided in a posture inclined to the right side with respect to the longitudinal reference axis.

5. The vehicular lamp according to claim 2, wherein an area of the rear lens cuts is covered with an area of the front lens cuts.

6. The vehicular lamp according to claim 2, wherein the light source emits light rays having the strongest luminous intensity along an optical axis thereof and light rays decreasing in luminous intensity as the angle with respect to the optical axis increases, and has a lens unit configured to convert the light rays into light rays radially emitted with uniform luminance.

7. The vehicular lamp according to claim 1, wherein each of the plurality of front lens cuts is a diffusion surface configured to diffuse the light rays from the light source, which are to be outputted through the front lens cuts, in up, down, left, and right directions.

8. The vehicular lamp according to claim 7, wherein that each of the plurality of front lens cuts is a convex lens surface convex to the side opposite to the light source.

9. The vehicular lamp according to claim 7, wherein when a longitudinal reference axis is defined to extend in a vehicle front-rear direction in the light output direction of the light rays, the inclined postures of the rear lens cuts are configured such that the rear lens cut disposed on the longitudinal reference axis is provided in a posture perpendicular to the reference axis, the rear lens cut disposed on a left side with respect to the longitudinal reference axis is provided in a posture inclined to the left side with respect to the longitudinal reference axis, and the lens cut disposed on a right side with respect to the longitudinal reference axis is provided in a posture inclined to the right side with respect to the longitudinal reference axis.

10. The vehicular lamp according to claim 7, wherein an area of the rear lens cuts is covered with an area of the front lens cuts.

11. The vehicular lamp according to claim 1, wherein the front surface includes a projecting portion configured to project from the front surface in the light output direction and be provided with the front lens cut at its tip.

12. The vehicular lamp according to claim 1, wherein each of the plurality of front lens cuts has an outer shape of a hexagon.

13. The vehicular lamp according to claim 12, wherein when a longitudinal reference axis is defined to extend in a vehicle front-rear direction in the light output direction of the light rays, the inclined postures of the rear lens cuts are configured such that the rear lens cut disposed on the longitudinal reference axis is provided in a posture perpendicular to the reference axis, the rear lens cut disposed on a left side with respect to the longitudinal reference axis is provided in a posture inclined to the left side with respect to the longitudinal reference axis, and the lens cut disposed on a right side with respect to the longitudinal reference axis is provided in a posture inclined to the right side with respect to the longitudinal reference axis.

14. The vehicular lamp according to claim 12, wherein an area of the rear lens cuts is covered with an area of the front lens cuts.

15. The vehicular lamp according to claim 1, wherein when a longitudinal reference axis is defined to extend in a vehicle front-rear direction in the light output direction of the light rays, the inclined postures of the rear lens cuts are configured such that the rear lens cut disposed on the longitudinal reference axis is provided in a posture perpendicular to the reference axis, the rear lens cut disposed on a left side with respect to the longitudinal reference axis is provided in a posture inclined to the left side with respect to the longitudinal reference axis, and the lens cut disposed on a right side with respect to the longitudinal reference axis is provided in a posture inclined to the right side with respect to the longitudinal reference axis.

16. The vehicular lamp according to claim 15, wherein an area of the rear lens cuts is covered with an area of the front lens cuts.

17. The vehicular lamp according to claim 15, wherein the light source emits light rays having the strongest luminous intensity along an optical axis thereof and light rays decreasing in luminous intensity as the angle with respect to the optical axis increases, and has a lens unit configured to convert the light rays into light rays radially emitted with uniform luminance.

18. The vehicular lamp according to claim 1, wherein an area of the rear lens cuts is covered with an area of the front lens cuts.

19. The vehicular lamp according to claim 18, wherein the light source emits light rays having the strongest luminous intensity along an optical axis thereof and light rays decreasing in luminous intensity as the angle with respect to the optical axis increases, and has a lens unit configured to convert the light rays into light rays radially emitted with uniform luminance.

20. The vehicular lamp according to claim 1, wherein the light source emits light rays having the strongest luminous intensity along an optical axis thereof and light rays decreasing in luminous intensity as the angle with respect to the optical axis increases, and has a lens unit configured to convert the light rays into light rays radially emitted with uniform luminance.

* * * * *